United States Patent [19]

Eimers et al.

[11] 4,367,303
[45] Jan. 4, 1983

[54] SOLUTIONS FOR STABILIZING THERMOPLASTIC POLYCARBONATES

[75] Inventors: Erich Eimers; Rolf Dhein, both of Krefeld; Wolfgang Cohnen, Leverkusen; Engelbert Kühle; Gerhard Heywang, both of Bergisch Gladbach, all of Fed. Rep. of Germany

[73] Assignee: Bayer Aktiengesellschaft, Leverkusen, Fed. Rep. of Germany

[21] Appl. No.: 277,312

[22] Filed: Jun. 25, 1981

[30] Foreign Application Priority Data

Jul. 12, 1980 [DE] Fed. Rep. of Germany ....... 3026503

[51] Int. Cl.³ ........................... C08K 5/15; C08K 5/50
[52] U.S. Cl. .............................. 524/107; 252/400 A; 252/407; 524/109; 524/154; 524/709
[58] Field of Search .................. 260/45.7 P, 45.8 A, 260/45.9 KA, 45.95 D; 252/400 A, 407; 524/107, 109, 154

[56] References Cited

U.S. PATENT DOCUMENTS

| | | | |
|---|---|---|---|
| 2,981,716 | 4/1961 | Street et al. | 260/45.7 P |
| 3,547,877 | 12/1970 | Savides | 260/45.9 KA |
| 3,594,346 | 7/1971 | Hermann et al. | 260/45.7 P |
| 3,597,390 | 8/1971 | Miller | 260/45.7 |
| 3,609,118 | 9/1971 | Pilz et al. | 260/45.7 P |
| 3,962,179 | 6/1976 | Chen | 260/45.7 P |
| 4,102,859 | 7/1978 | Eimers et al. | 260/45.8 A |
| 4,225,483 | 9/1980 | Eimers et al. | 260/45.8 A |

FOREIGN PATENT DOCUMENTS

| | | |
|---|---|---|
| 2206720 | 8/1973 | Fed. Rep. of Germany. |
| 2658849 | 7/1977 | Fed. Rep. of Germany. |
| 1350338 | 4/1974 | United Kingdom. |
| 1561890 | 3/1980 | United Kingdom. |

OTHER PUBLICATIONS

Chemical Abstracts, vol. 77, No. 26, Dec. 25, 1972, p. 38, No. 165584W.
Hackh's Chemical Dictionary, 4th Edition, pp. 515–516, Julius Grant Ed., McGraw-Hill Book Company.

*Primary Examiner*—John Kight, III
*Assistant Examiner*—R. A. White
*Attorney, Agent, or Firm*—Gene Harsh; Lawrence S. Pope; Aron Preis

[57] ABSTRACT

Certain solutions of phosphines in oxetane compounds impart oxidative stability to aromatic thermoplastic polycarbonates in which such solutions are admixed.

15 Claims, No Drawings

SOLUTIONS FOR STABILIZING THERMOPLASTIC POLYCARBONATES

FIELD OF THE INVENTION

The present invention relates to aromatic thermoplastic polycarbonates and in particular to means to impart oxidative stability to said polycarbonates.

SUMMARY OF THE INVENTION

The present invention relates to solutions of phosphines of the formula I $$(R)_2PR_1 \qquad \qquad I$$

wherein
R is an unsubstituted or substituted $C_6$–$C_{14}$-aryl radical and
$R_1 = R$ or is an unsubstituted or substituted $C_1$–$C_{18}$-alkyl radical,
in oxetane compounds of the formula II

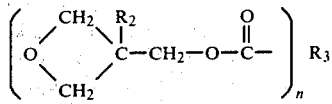

wherein
$R_2$ is $C_1$–$C_{16}$-alkyl and
$R_3$ is either an n-valent radical of a $C_2$–$C_8$-alkane, which can also be substituted by OH groups, and n is a number from 1 to 6, or
$R_3$ is a 2-valent radical of a cycloalkane and n is 2,
or in oxetane compounds of the formula III

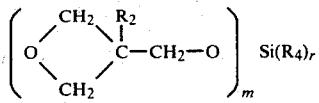

wherein
$R_2$ is $C_1$–$C_{16}$-alkyl,
$R_4$ is $C_1$–$C_4$-alkyl, which can optionally be substituted by cyano, carboxyl or acetoxy, or is allyl, $C_6$–$C_{14}$-aryl which is optionally substituted by alkyl, $C_7$–$C_{14}$-aralkyl or $C_1$–$C_4$-alkoxy which can optionally be substituted by $C_1$–$C_4$-alkoxy or allyloxy,
m is an integer from 1 to 4 and
r is an integer from 0 to 3, m+r always being 4.

The radicals R in the compounds of the formula I can be either identical or different.

The particular components of the solutions according to the invention, that is to say the phosphines and oxetane compounds, should have a boiling point of at least 200° C.; furthermore, the solutions according to the invention should have a melting point of at most 40° C.

The mixture ratio of dissolved phosphine of the formula I to the solvent containing oxetane groups, of formula II or III is between 3 and 10 oxetane group equivalents of the solvent containing oxetane groups per atom equivalent of phosphorus of the phosphine, in particular between 4 and 8 oxetane group equivalents of the solvent containing oxetane groups per atom equivalent of phosphorus of the phosphine.

The present invention also relates to the use of the stabilizer solutions according to the invention for stabilizing polycarbonate.

The present invention also relates to a process for stabilizing thermoplastic polycarbonates, which is characterized in that the stabilizer solutions according to the invention are added to the thermoplastic polycarbonate in a known manner during or after its preparation.

The present invention also relates to stabilized thermoplastic polycarbonates which have been stabilized by the addition of the solutions according to the invention in amounts of 0.02 to 1% by weight, relative to the total weight of thermoplastic polycarbonate and stabilizer solution.

The stabilizing operation according to the invention on polycarbonates has the effect of stabilizing them against the influence of heat and/or oxygen.

DESCRIPTION OF THE PRIOR ART

The stabilization of polycarbonates with phosphines is known from Japanese Laid-Open Specification No. 72 22 088 of Mitsubishi Gas Kagaku (date of application: 28.5,68, date of publication: 21.6,1972) and from DE-OS (German Published Specification) No. 2,206,720. The latter literature reference also describes the stabilization of polycarbonates with mixtures of phosphines and epoxide compounds.

The stabilization of polycarbonates with oxetane compounds is also known (DE-OS (German Published Specification) No. 2,658,849), as well as the stabilization of polycarbonates with mixtures of oxetane compounds and phosphites (DE-OS (German Published Specification) No. 2,510,463 (LeA 16,231) and DE-OS (German Published Specification) No. 2,658,849).

According to British Patent Specification No. 1,141,869, silanes are suitable as trans-esterification catalysts which are used for the preparation of polycarbonates by the melt trans-esterification process, and at the same time provide a stabilizing effect and do not give rise to the discolorations and cloudiness of the polycarbonate prepared, which some other trans-esterification catalysts cause. The silanes employed contain at most one alkoxysilane radical.

Combined stabilization with organic silicon compounds and phosphites and, if appropriate, other stabilizers is described, for example, in DE-OS (German Published Specification) No. 2,726,662, DE-OS (German Published Specification) No. 2,659,756, DE-OS (German Published Specification) No. 2,741,064, DE-OS (German Published Specification) No. 2,510,463 and U.S. Pat. No. 4,138,379.

The stabilizer combination, claimed according to the invention, of phosphine and oxetane compound or silicon compound has not been described in any of the literature references mentioned.

The combination according to the invention is not obvious, for the following reasons:

As already mentioned, it was indeed known to use, on the one hand, phosphites containing oxetane groups or mixtures of oxetane-free phosphites and phosphorus-free oxetane compounds and, on the other hand, mixtures of phosphines and epoxy compounds as stabilizers in polycarbonates. However, from the advantageous effect of oxetane compounds on phosphites it could not have been deduced that oxetane compounds would exert a similarly advantageous and synergistic effect on phosphines, which have a completely different chemical structure and differ from the phosphites in that they contain no groups which can be split off by hydrolysis and thus can be converted into phosphoric acids under the influence of hydrolytic processes. In contrast, if it is assumed that acid degradation products are also formed during the conversion of the phosphine in the course of heat-ageing of the polycarbonate, it is again surprising that the polycarbonate which has been stabilized according to the invention have good hydrolytic stability, since, as is known, acid degradation products reduce the stability of the polycarbonate to hydrolysis.

As can be seen from the other examples given, neither phosphine by itself nor a mixture of an aliphatic phosphine and an oxetane compound, nor a mixture or triphenylphosphine and an epoxide compound, have as good an action as that of the solutions claimed according to the invention. From this, it is evident that the action of the combination claimed according to the invention could be neither deduced nor predicted from the literature previously known or from the chemical nature of the components of the solution.

DETAILED DESCRIPTION OF THE INVENTION

In the compounds of the formula I, the aryl radicals R can, for example, also be substituted by alkyl substituents, halogens or OH. The alkyl radicals $R_1$ of the compounds of the formula I can be straight-chain or branched. They can be substituted, for example by OH, alkylcarboxy, cyano or phenyl.

Examples of phosphines of formula I which are suitable according to the invention are: triphenylphosphine, diphenylbutylphosphine, diphenyl-octadecylphosphine, tris-p-tolyl-phosphine, tris-(p-nonylphenyl)-phosphine, tris-naphthylphosphine, diphenyl-(hydroxymethyl)-phosphine, diphenyl-acetoxymethylphosphine, diphenyl-($\beta$-ethylcarboxy-ethyl) phosphine, tris-(p-chlorophenyl)-phosphine, tris-(p-fluorophenyl)-phosphine, diphenyl-benzyl-phosphine, diphenyl-$\beta$-cyano-ethyl-phosphine, diphenyl-(p-hydroxyphenyl)-phosphine, diphenyl-1,4-dihydroxy-phenyl-2-phosphine and phenyl-naphthyl-benzylphosphine.

Either individual compounds or mixtures of the phosphines mentioned can be used.

Examples of oxetane compounds of formula II which are suitable according to the invention are: adipic acid bis-3-ethyl-oxetanyl-3-methyl ester, adipic acid bis-3-amyl-oxetanyl-3-methyl ester, malonic acid bis-3-amyl-oxetanyl-3-methyl ester, azelaic acid bis-3-methyloxetanyl-3-methyl ester, sebacic acid bis-3-methyloxetanyl-3-methyl ester, citric acid tris-3-methyloxetanyl-3-methyl ester, butane-1,2,3,4-tetracarboxylic acid tetrakis-3-ethyloxetanyl-3-methyl ester and cyclohexane-1,2-dicarboxylic acid bis-3-ethyloxetanyl-3-methyl ester.

Either individual compounds of formula II or mixtures of the compounds mentioned can be used.

Examples of oxetane compounds of formula III which are suitable according to the invention are methyltris-(3-ethyl-oxetanyl-3-methoxy)-silane, dimethyl-bis-(3-amyl-oxetanyl-3-methoxy)-silane, bis-ethoxy-bis-(3-ethyloxetanyl-3-methoxy)-silane, phenyl-tris-(3-ethyloxetanyl-3-methoxy)-silane, benzyl-tris-(3-methyloxetanyl-3-methoxy)-silane, ($\beta$-butoxyethoxy)-tris-(3-methyl-oxetanyl-$\beta$-methoxy)-silane, ($\beta$-allyloxy-ethoxy)-tris-(3-ethyl-oxetanyl-3-methoxy)-silane, diallyl-bis-(3-amyl-oxetanyl-3-methoxy)-silane, $\beta$-cyano-ethyl-tris-(3-propyl-oxetanyl-3-methoxy)-silane, $\beta$-carboxyethyl-tris-(3-methyl-oxetanyl-3-methoxy)-silane, $\beta$-phenyl-ethyl-tris-(3-ethyl-oxetanyl-3-methoxy)-silane and (3-acetoxy-propyl)-tris-(3-ethyloxetanyl-3-methoxy)-silane.

Either individual compounds of formula III or mixtures of the compounds mentioned can be used.

The compounds of the formulae I, II and III which have been mentioned are known from the literature or can be prepared by processes which are known from the literature.

The thermoplastic polycarbonates to be stabilized according to the invention are the polycondensates obtainable by reacting diphenols with phosgene or diesters of carbonic acid, dihydroxydiarylalkanes in which the aryl radicals in the o- and/or m-position relative to the hydroxyl group carry methyl groups or halogen atoms are also suitable, in addition to unsubstituted dihydroxydiarylalkanes. Branched polycarbonates are likewise suitable.

The polycarbonates to be stabilized have an average molecular weight of ($\overline{M}w$) of between 10,000 and 100,000, preferably between 20,000 and 40,000, determined by measurements of the relative viscosity in $CH_2Cl_2$ at 25° C. and at a concentration of 0.5% by weight. Suitable diphenols are, for example, hydroquinone, resorcinol, 4,4'-dihydroxydiphenyl, bis-(hydroxyphenyl)-alkanes, such as, for example, $C_1$–$C_8$-alkylene- or $C_2$–$C_8$-alkylidene-bisphenols, bis-(hydroxyphenyl)-cycloalkanes, such as, for example, $C_5$–$C_{15}$-cycloalkylene- or $C_5$–$C_{15}$-cycloalkylidene-bisphenols, and bis-(hydroxyphenyl) sulphides, ethers, ketones, sulphoxides or sulphones, furthermore, $\alpha,\alpha'$-bis-(hydroxy-phenyl)-diisopropylbenzene and the corresponding nuclear-alkylated or nuclear-halogenated compounds. Polycarbonates based on 2,2-bis-(4-hydroxy-phenyl)-propane (bisphenol A), 2,2-bis-(4-hydroxy-3,5-dichlorophenyl)-propane (tetrachlorobisphenol A), 2,2-bis-(4-hydroxy-3,5-dibromophenyl)-propane (tetrabromobisphenol A), 2,2-bis-(4-hydroxy-3,5-dimethyl-phenyl)-propane (tetramethylbisphenol A) or 1,1-bis-(4-hydroxyphenyl)-cyclohexane (bisphenol Z), and those based on trinuclear bisphenols, such as $\alpha,\alpha'$-bis-(4-hydroxyphenyl)-p-diisopropylbenzene.

Other bisphenols which are suitable for the preparation of polycarbonates are described in U.S. Pat. Nos. 3,028,365; 2,999,835; 3,148,172; 2,970,131; 2,991,273; 3,271,367 and 2,999,846.

The stabilizer solutions according to the invention are prepared in a known manner by dissolving the phosphines in the oxetane compounds in the particular proportions, appropriately in the absence of atmospheric oxygen.

The stabilization, according to the invention, of the thermoplastic polycarbonates can be carried out in any desired manner, and advantageously, for example, in the course of the preparation of the polycarbonate, and especially as a continuous procedure, since the stabilizers are liquid at low temperature. The stabilizer solution can be introduced continuously, through a suitable conveying pump, during the final phase of the preparation, in which the molten polycarbonate is continuously freed from solvent in vacuo in a conveying screw. Furthermore, it is of course possible to stabilize the polycarbonate, for example by so-called tumbling, with the claimed solution after the preparation of the polycarbonate; this method is described in the examples of this Application and is an incorporation method known from the literature.

The amounts of stabilizer to be employed are between 0.01 and 1% by weight, preferably between 0.02 and 0.5% by weight and in particular between 0.05 and 0.2% by weight, in each case relative to the total weight of thermoplastic polycarbonate and stabilizer solution.

The polycarbonates which have been stabilized according to the invention can also contain the known additives, such as, for example, fillers, dyestuffs, pigments and/or other stabilizers.

The thermoplastic polycarbonates which have been stabilized according to the invention can also be mixed with other thermoplastics in a known manner, for example with ABS polymers, polystyrenes, polyarylenesulphones or polyalkylene terephthalates.

The polycarbonates which have been stabilized according to the invention are used, in particular, where the shaped articles produced are exposed to prolonged high temperatures, and in addition for all articles for which a high light transmission is required. This applies, preferably to their use in the light sector, for example for lamp coverings or glazing using polycarbonate sheets.

The parts mentioned in the examples are parts by weight.

PREPARATION OF A POLYCARBONATE 454 parts of 2,2-bis-(p-hydroxy-phenyl)-propane and 2.5 parts of p-tert.-butylphenol are suspended in 1.5 l of water in a three-necked flask, provided with a stirrer and gas inlet tube, and the oxygen is then removed from the reaction mixture by passing nitrogen through the reaction mixture for 15 minutes, while stirring. 355 parts of 45% strength sodium hydroxide solution and 1,000 parts of methylene chloride are then added. The mixture is cooled to 25° C. 237 parts of phosgene are added over a period of 120 minutes, while maintaining the above temperature by cooling. An additional amount of 75 parts of 45% strength sodium hydroxide solution is added after 15 to 30 minutes, or after the absorption of phosgene has started. 1.6 parts of triethylamine are added to the resulting solution and the mixture is stirred for a further 15 minutes. A highly viscous solution is obtained, the viscosity of which is regulated by adding methylene chloride. The aqueous phase is separated off. The organic phase is washed with water until free from salts and alkali. The polycarbonate is isolated from the washed solution and dried. The polycarbonate has a relative viscosity of 1.29 to 1.30, measured in a 0.5% strength solution in methylene chloride at 20° C. This corresponds approximately to a molecular weight of 32,000. The polycarbonate thus obtained is extruded and granulated.

Preparation of stabilized polycarbonates

The granular polycarbonate prepared according to the above description is mixed, by so-called tumbling, with the various phosphites or stabilizer solutions in the amounts given in the following table. The granules are then extruded to a strand at 300° C. in a mixing screw. This strand is again granulated, and the granules are processed to standard test bars in an injection-molding machine at 330° C.

The following stabilizers were employed:

I. Comparison experiments (A) Tris-3-ethyl-oxetanyl-3-methyl phosphite
(B) Triphenylphosphine
(C) Tricyclohexylphosphine dissolved in adipic acid bis-3-ethyl-oxetanyl-3-methyl ester. Molar ratio of phosphine to oxetane compound = 1:3, corresponding to a ratio of P to oxetane group of 1:6 (the solution is solid at room temperature).
(D) Triphenylphosphine dissolved in hexahydrophthalic acid bis-glycidyl ester. Molar ratio of 1:3, corresponding to a ratio of P to epoxide group of 1:6.

II. According to the invention (A) Triphenylphosphine dissolved in adipic acid bis-3-ethyloxetanyl-3-methyl ester. Molar ratio to oxetane compound = 1:3, corresponding to a ratio of P to oxetane group of 1:6.
(B) Triphenylphosphine dissolved in dimethyl-bis-3-ethyl-oxetanyl-3-methylsilane. Molar ratio of phosphine to oxetane compound = 1:3, corresponding to a ratio of P to oxetane group of 1:6.

The amount of stabilizer added is 0.1% by weight, relative to stabilized polycarbonate, in all the examples.

Heat aging

The test pieces produced in the manner described above were heated at 140° C. in a drying cabinet. The light transmission was measured with the aid of a spectrophotometer. The particular drop in light transmission at 420 nm in the course of the heat treatment serves as a measure of the increasing browning of the test pieces (see table).

Light transmission in %, measured in accordance with the method of DIN 5036, of PC bars at 420 nm in a cell thickness of 4 mm

| Stabilizer | 0 hours | 500 hours heating at 140° C. |
|---|---|---|
| I A | 84 | 78.5 light transmission |
| I B | 84 | 76 |
| I C | 81.5 | (no brightening effect) |
| I D | 80.5 | (no brightening effect) |
| II A | 84 | 81 |
| II B | 83.5 | 82 |

Hydrolysis Test

A number of shaped Makrolon articles which have been produced with and without stabilizers and have the dimensions 50×6×4 mm (so-called small standard bars) are stored in boiling distilled water in an electrically heated round-bottomed flask. After certain intervals of time, in each case 10 bars are removed and their relative solution viscosity (in CH$_2$Cl at 25° C. and at a concentration of 0.5% by weight) is measured. The resulting average values of the individual measurements on the 10 bars are given in the following table.

|  | relative viscosity | relative viscosity |  |
|---|---|---|---|
| PC, no stabilizer | 1.296 | 1.275 | 0.020 |
| I A | 1.289 | 1.126 | 0.163 |
| II A | 1.297 | 1.278 | 0.019 |

It can be seen that the degradation in molecular weight during hydrolysis of the polycarbonate which has been stabilized according to the invention is no greater than in the case of unstabilized material, and that the degradation is significantly less than that of a polycarbonate stabilized with phosphite only.

What is claimed is:

1. A solution comprising at least one phosphine of the general formula $$(R)_2P-R_1 \quad \text{I}$$

wherein
 R and $R_1$ independently denote an unsubstituted or substituted $C_6$ to $C_{14}$ aryl radical and
 $R_1$ may additionally denote an unsubstituted or substituted $C_1$ to $C_{18}$ alkyl radical
in at least one oxetane compound of the general formula $$\left( O \underset{CH_2}{\overset{CH_2}{<}} C \underset{R_2}{\overset{R_2}{|}} -CH_2-O-\overset{O}{\underset{\|}{C}}- \right)_n R_3 \quad \text{II}$$

wherein
 $R_2$ denotes a $C_1$ to $C_{16}$ alkyl radical and
 $R_3$ is either an n-valent radical of a $C_2$ to $C_8$ alkane, which may be substituted by at least one OH group and
 n is 1, 2, 3, 4, 5, or 6 or
 $R_3$ is a divalent radical of a cycloalkane and
 n is 2,
or in at least one oxetane compound of the general formula $$\left( O \underset{CH_2}{\overset{CH_2}{<}} C \underset{R_2}{\overset{R_2}{|}} -CH_2-O \right)_m Si(R_4)_r \quad \text{III}$$

wherein
 $R_2$ denotes a $C_1$ to $C_{16}$ alkyl radical,
 $R_4$ denotes a $C_1$ to $C_4$ alkyl radical which may be substituted by cyano, carboxyl or acetoxy, an allyl radical, a $C_6$ to $C_{14}$ aryl radical which may be substituted by alkyl, or a $C_7$ to $C_{14}$ aralkyl or $C_1$ to $C_4$ alkoxy radical which may be substituted by $C_1$ to $C_4$ alkoxy or allyloxy,
 m is 1, 2, 3, or 4 and
 r is 0, 1, 2 or 3 with the proviso that m+r equal 4,
in which the mixing ratio of dissolved phosphine of the formula I to solvent, containing oxetane groups, of the formula II or III is between 3 and 10 oxetane group equivalents of the solvent containing oxetane groups per atom equivalent of phosphorus of the phosphine.

2. The solution of claim 1, wherein said mixing ratio is between 4 and 8 oxetane group equivalents of the solvent containing oxetane groups per atom equivalent of phosphorus of the phosphine.

3. The solution of claim 1 wherein said R is a $C_6$ to $C_{14}$ aryl, substituted by a member selected from the group consisting of alkyl, halogen and OH radicals.

4. The solution of claim 1 wherein said $R_1$ is a straight chain $C_1$ to $C_{18}$ alkyl.

5. The solution of claim 1 wherein said $R_1$ is a branched $C_3$ to $C_{18}$ alkyl.

6. The solution of claim 1 wherein said $R_1$ is substituted by a member selected from the group consisting of OH, alkyl carboxy, cyano or phenyl radicals.

7. A process for stabilizing a thermoplastic polycarbonate comprising adding thereto a stabilizer solution comprising at least one phosphine of the general formula $$(R)_2P-R_1 \quad \text{I}$$

wherein
 R and $R_1$ independently denote an unsubstituted or substituted $C_6$ to $C_{14}$ aryl radical and
 $R_1$ may additionally denote an unsubstituted or substituted $C_1$ to $C_{18}$ alkyl radical
in at least one oxetane compound of the general formula $$\left( O \underset{CH_2}{\overset{CH_2}{<}} C \underset{R_2}{\overset{R_2}{|}} -CH_2-O-\overset{O}{\underset{\|}{C}}- \right)_n R_3 \quad \text{II}$$

wherein
 $R_2$ denotes a $C_1$ to $C_{16}$ alkyl radical and
 $R_3$ is either an n-valent radical of a $C_2$ to $C_8$ alkane, which may be substituted by at least one OH group and
 n is 1, 2, 3, 4, 5, or 6 or
 $R_3$ is a divalent radical of a cycloalkane and
 n is 2,
or in at least one oxetane compound of the general formula $$\left( O \underset{CH_2}{\overset{CH_2}{<}} C \underset{R_2}{\overset{R_2}{|}} -CH_2-O \right)_m Si(R_4)_r \quad \text{III}$$

wherein
 $R_2$ denotes a $C_1$ to $C_{16}$ alkyl radical,
 $R_4$ denotes a $C_1$ to $C_4$ alkyl radical which may be substituted by cyano, carboxyl or acetoxy, an allyl radical, a $C_6$ to $C_{14}$ aryl radical which may be substituted by alkyl, or a $C_7$ to $C_{14}$ aralkyl or $C_1$ to $C_4$ alkoxy radical which may be substituted by $C_1$ to $C_4$ alkoxy or allyloxy,
 m is 1, 2, 3, or 4 and
 r is 0, 1, 2 or 3 with the proviso that m+r equal 4,
in which the mixing ratio of dissolved phosphine of the formula I to solvent, containing oxetane groups, of the formula II or III is between 3 and 10 oxetane group equivalents of the solvent containing oxetane groups per atom equivalent of phosphorus of the phosphine said solution being added to said polycarbonate either during or after its preparation.

8. The process of claim 7 wherein said mixing ratio is between 4 and 8 oxetane group equivalents of the solvent containing oxetane groups per atom equivalent of phosphorus of the phosphine.

9. The process of claim 7 wherein said $R_1$ is a $C_6$ to $C_{14}$ aryl, substituted by a member selected from the group consisting of alkyl, halogen and OH radicals.

10. The process of claim 7 wherein said $R_1$ is a straight chain $C_1$ to $C_{18}$ alkyl.

11. The process of claim 7 wherein said $R_1$ is a branched $C_3$ to $C_{18}$ alkyl.

12. The process of claim 7 wherein said $R_1$ is substituted by a member selected from the group consisting of OH, alkyl carboxy, cyano or phenyl radicals.

13. The process of claim 11 wherein said stabilizer solution is added in an amount of 0.01 to 1% by weight, relative to the total weight of thermoplastic polycarbonate and stabilizer solution.

14. The process of claim 11 wherein said stabilizer solution is added in an amount of 0.05 to 0.2% by weight, relative to the total weight of thermoplastic polycarbonate and stabilizer solution.

15. A stabilized thermoplastic polycarbonate obtained by the process of claim 11.

* * * * *